United States Patent

Alexander et al.

[11] Patent Number: 5,816,450
[45] Date of Patent: Oct. 6, 1998

[54] PNEUMATIC FROSTING APPLICATOR

[76] Inventors: David C. Alexander, 555 Sanders St.;
Robert B. Rummer, 1132 Annalue Dr.;
Kenneth H. Patrick, 1130 Elkins Dr.,
all of Auburn, Ala. 36830

[21] Appl. No.: 758,231

[22] Filed: Nov. 27, 1996

[51] Int. Cl.⁶ .................................................. B67D 5/42
[52] U.S. Cl. .................................. 222/179; 222/389
[58] Field of Search ............................. 222/108, 179, 222/389, 478, 479, 571

[56] References Cited

U.S. PATENT DOCUMENTS

| 3,272,393 | 9/1966 | Roeser | 222/389 |
| 4,932,094 | 6/1990 | McCowin | 222/389 |

FOREIGN PATENT DOCUMENTS 500901  11/1954  Italy ....................................... 222/389

*Primary Examiner*—Philippe Derakshani

[57] ABSTRACT

A pneumatic frosting applicator apparatus designed for dispensing viscous material, primarily frosting for the decoration of baked goods. The device permits the user to dispense frosting using the same natural and easy position utilized by experienced decorators but in a more ergonomically enhanced manner. The device further permits the user to more precisely control the flow of frosting and to dispense the frosting in a smooth continuous fashion. The device is simple to operate and to clean, easy to manufacture, and is affordable.

17 Claims, 9 Drawing Sheets

PNEUMATIC FROSTING APPLICATOR

FIELD OF INVENTION

This invention relates to devices used in decorating baked goods. In particular, this invention relates to devices used to apply frosting on cakes and other baked goods.

BACKGROUND OF THE INVENTION

There are several devices currently in use by those who make and decorate cakes and other baked goods. The present invention is a distinct improvement over prior frosting applicators in that it is not only more efficient and convenient to use but is also ergonomically superior to previous devices. Moreover, the instant device is adjustable for each individual user's comfort and, because it contains relatively few parts, is also inexpensive.

Currently, the use of flexible, cone-shaped decorating bags to apply the frosting is one of the most common methods for decorating baked goods. Frosting and custom coloring agents are mixed in small batches and then packed into the decorating bag. Interchangeable tip configurations are attached to the cone tip end of the decorating bag to produce various decorative features. The user must manually squeeze the frosting out of the decorating bag through the decorative tip onto the baked goods, using one and sometimes two hands. Manipulation of such applicators requires continuous tightening and squeezing of the decorating bag in order to obtain consistent and smooth application of the frosting without the possibility of air pockets which, if present, might create defects in the applied frosting. The repetitive movements and the force required for proper use of such decorating bags frequently cause users to develop cumulative trauma hand disorders. Moreover, due to the abrupt hand motions involved in applying the frosting designs and lettering, it is difficult to provide even and continuous flow of materials from the applicator while having to tightly squeeze the decorating bag. Also, the interchangeable decorative tips are often connected to the bag by a nut which is small and difficult to turn, especially when a coating of icing is on the nut and/or the user's hands. Notwithstanding these difficulties, users of such apparatuses have continued to decorate baked goods with such simple devices because of the ability to discharge frosting downward while holding the bag in front of the user in a vertical position which facilitates more precise designs and decorations.

The art of applying frostings and decorations to baked goods has failed to satisfactorily address these difficulties which are inherent in such manual devices. For example, some devices attempt to alleviate the stress on the user's hands by employing compressed air to collapse flexible decorating bags, or bladders, and thereby force the frosting out of the decorative tip. These devices are, however, difficult to control and tend to collapse the bladders into the flow path of the frosting being dispensed thus retarding or preventing altogether flow of the frosting. These devices also present cleaning problems. (U.S. Pat. No. 4,986,444 entitled *Guns Intended for Extruding Pastry Products* by D. Corso; U.S. Pat. No. 5,312,018 entitled *Containing and Dispensing Device for Flowable Material Having Relatively Rigid and Deformable Material Containment Portions* by P. Evezich).

Other devices attempt to enhance the dispensation of the frosting by employing flexible appendages. For instance, U.S. Pat. No. 3,921,858 entitled *Automatic Confections Decorating System* by R. Bemm, discloses a container with a flexible hose which is also used as the handle. The Bemm device is difficult to use, however, because the small diameter of the tube requires repeated filling and makes extended usage troublesome. Moreover, if the hose is large enough to contain sufficient quantities of frosting to allow for prolonged usage, it becomes unwieldy and difficult to use. Furthermore, at any length, the weight of the material within the hose causes a torque or moment which must be opposed by the operator. Such additional and repetitive stress on the operator's hands can cause cumulative trauma disorders. The Bemm device is also designed such that it does not have a piston to provide motive force to the material being forced through the tube. Thus, air bubbles can form in the material stream, causing defects in the final decorated product. Additionally, if pressurized systems are employed with the Bemm device, the material being extruded may continue flowing for an instant after release of the pressure, causing a drip which can mar the appearance of the decorated item. While the Bemm device attempts to address problems associated with dripping by providing a pinch-cock valve in the material flow path, the pinch-cock causes discontinuities in the flow path which may cause air bubbles resulting in blemished extrusions.

Other devices are disclosed which resemble a caulking gun adapted to dispense frosting. U.S. Pat. No. 5,361,946 entitled *Icing Dispersing Apparatus* by P. Ginther et al. and U.S. Pat. No. 4,273,270 entitled *Trigger Actuated Air Pressure Dispensing Gun* by G. Kray are such examples. While these devices facilitate improved dispensation of frosting, they utilize an ergonomically inferior design rendering the user susceptible to cumulative trauma disorders. Specifically, both the Ginther device, which is designed to rest on the user's forearm, and the Kray device, which is hand-held, require the user's wrist to remain locked in one position while the arm must remain bent at a downward and awkward angle. In addition, the users of these devices must employ a motion different from and inferior to that which is desired and commonly practiced by those skilled in the industry, including those using the decorating bags. Thus, users of these two device designs will require training for use of these specific devices. The Ginther and Kray devices have at least one additional limitation in that their design does not permit the use of large capacity containers.

Still other devices not only suffer from the same deficiencies as described above but possess additional problems because of their complex and expensive design. For example, U.S. Pat. No. 3,208,643 entitled *Apparatus to Discharge Food Material* by E. Phillips, discloses a device which comprises a cart mounted dispenser with a flexible hose through which frosting is dispensed in bulk. This device is ill-suited for small bakeries or frosting operations where multiple decorating stations are desired. Moreover, as a skilled artisan will appreciate, frosting decorating often requires custom colors which are most often mixed in small batches only. Thus, the Phillips device would not always be applicable because of its large capacity design.

Finally, other devices such as U.S. Pat. No. 4,392,592 entitled *Food Dispensing Gun* by N. Sullivan and U.S. Pat. No. 4,305,531 entitled *Pneumatically Operated Controlled Volume Dispensing Device* by D. Dooley and R. Bromps, are designed only for stationary usage and, in addition, do not permit continuous flow of material.

The present invention provides for marked improvement over devices currently employed in that the instant invention is ergonomically advanced. One object of the invention is the elimination of the repetitive motions and forces required by decorating bags of earlier design. Another object of the invention is to allow the user the same versatility of positioning the dispensing head that is employed by experienced decorators while maintaining natural and ergonomically correct body movements. Another object of the invention is to allow dispensing of material smoothly while maintaining precise control of the material flow. Still another object of the invention is to prevent dripping immediately upon interruption of material flow by use of an integral orifice or venturi. Another object of the invention is to provide for a convenient and more effective means of connecting the interchangeable nozzles used to form the various decorative features. Yet another object of the invention is to provide a design that is simple to manufacture (and therefore affordable) and is easy to clean and maintain.

SUMMARY OF THE INVENTION

The foregoing improvements and other improvements are attained in a dispenser consisting of a lightweight, hand-held pneumatic device which applies frosting by use of a pressurized piston which forces the frosting from a cylinder through the tip of a dispensing tube. The cylinder and dispensing tube are rigid. The dispensing tube is attached at the bottom of the cylinder and is angled such that the user's wrist is maintained in a natural position. The weight of the dispenser is fully supported with the center of mass above the hand. By keeping the center of mass above the hand, the operator need not apply a large torque or moment with the wrist to position the applicator. The invention includes a piston which is coaxially aligned in the container and rests on the top of the frosting. The piston allows for even application of pressure against the frosting and also prohibits the formation of air bubbles into the dispensing tube. A cover having a sealing gasket is attached to the container, creating an air tight chamber. The cover is fitted with a novel tee fitting (or "T") through which pressurized air is pumped and which is designed to prevent excessive extrusion or dripping of the frosting. The tee fitting accomplishes this objective by use of either an integral orifice or a venturi within the "T." The integral orifice or venturi creates a low pressure tap within the air pressure lane. Each end of the "T" provides means to connect pressurized air supply at one end of the "T" and a air discharge tube at the other end. The air discharge tube is connected to a trigger valve which permits the user to activate the device simply by applying slight pressure to the air discharge tube. The dispensing tube provides for attachment of standard decorating tips using an ergonomically designed compression nut. The nut is designed so that it is larger in diameter than those commonly used in decorating bags and therefore serves to prevent pressurized air leaving the air discharge tube from affecting the frosting as it is applied.

The invention is operated by loading frosting into the container and then placing the piston on the frosting. The cover is then placed on the container and secured to create an air tight seal. Pressurized air is then pumped through the air supply tube connected to the "T." When the trigger valve is actuated, the air discharge tube is closed off, forcing the air pressure to increase in the container. The piston is displaced by the compressed air, forcing the frosting through the dispensing tube and the decorating tip onto the work surface. When the trigger valve is released, air flows through the integral orifice (or the venturi) out the discharge tube, creating a slight vacuum in the container. The vacuum causes the piston to reverse immediately for a short distance, drawing back the frosting in the tip, allowing precise flow control and preventing dripping. The speed of frosting flow can be easily controlled by partially closing the trigger valve to vary the pressure in the container. The pressure source can be adjusted to accommodate a wide variety of consistencies.

BRIEF DESCRIPTION OF THE DRAWINGS

The foregoing and other objects or features and advantages of the present invention will be made apparent from the following detailed description of the preferred embodiments of the invention and from the drawings in which.

DETAILED DESCRIPTION OF THE INVENTION

Referring to FIGS. 1,2,3 and 9, the pneumatic frosting applicator includes a rigid cylindrical container 17 having a smooth internal chamber 29 which holds the material to be dispensed 24. The dimensions of the container 17 provide adequate volume for convenient and ergonomically sound decorating. It is envisioned that an optimum fill weight of the device would not exceed approximately 2.5 pounds as weight in excess of this level may cause undue stress on the typical operator. The dimensions of the container 17 are also limited by the internal pressure and the strength of the material from which it is made. In a preferred embodiment, the container 17 is made from a transparent material to facilitate viewing the color and level of the dispensed material 24.

Figure 3:
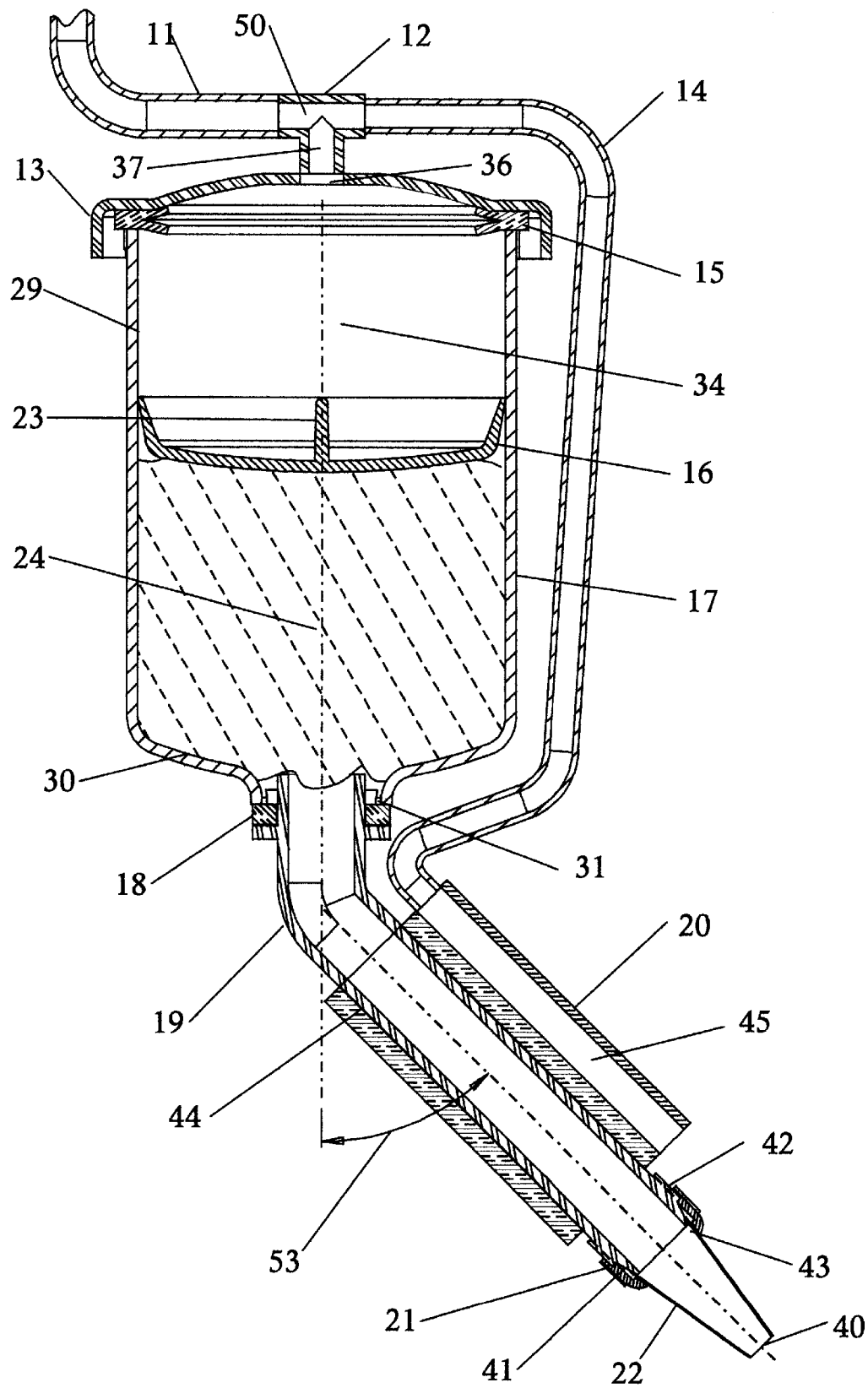
FIG. 3 is a side elevation sectional view of the applicator assembly.
Figure 4:
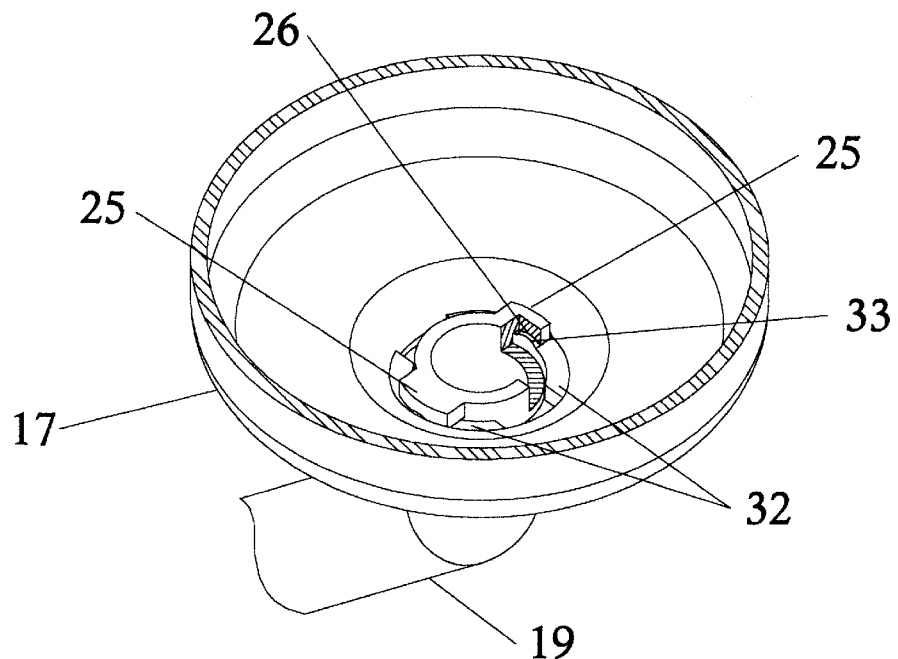
FIG. 4 is an isometric partial section view of the container and dispense tube interface with the dispense tube flange cut away to show detail.

The container 17 has at one end a smooth transition 30 to a cylindrical coaxial outlet 31 to which an angled dispensing tube 19 is connected by means now explained. Referring to FIGS. 3 and 4, the outlet 31 has two partial internal annular flanges 32 to allow insertion of mating external partial annular flanges 25 on the dispensing tube 19. The inside surface of each internal annular flange 32 has a raised centrally located protuberance 33 which mates with a corresponding recess 26 in the external annular flanges 25 of the dispensing tube 19. The dispensing tube 19 may be secured in place via rotation of the dispensing tube 19 recesses 26 in alignment with the protuberances 33. Locking tension and sealing are enhanced by a gasket 18.

Figure 1:
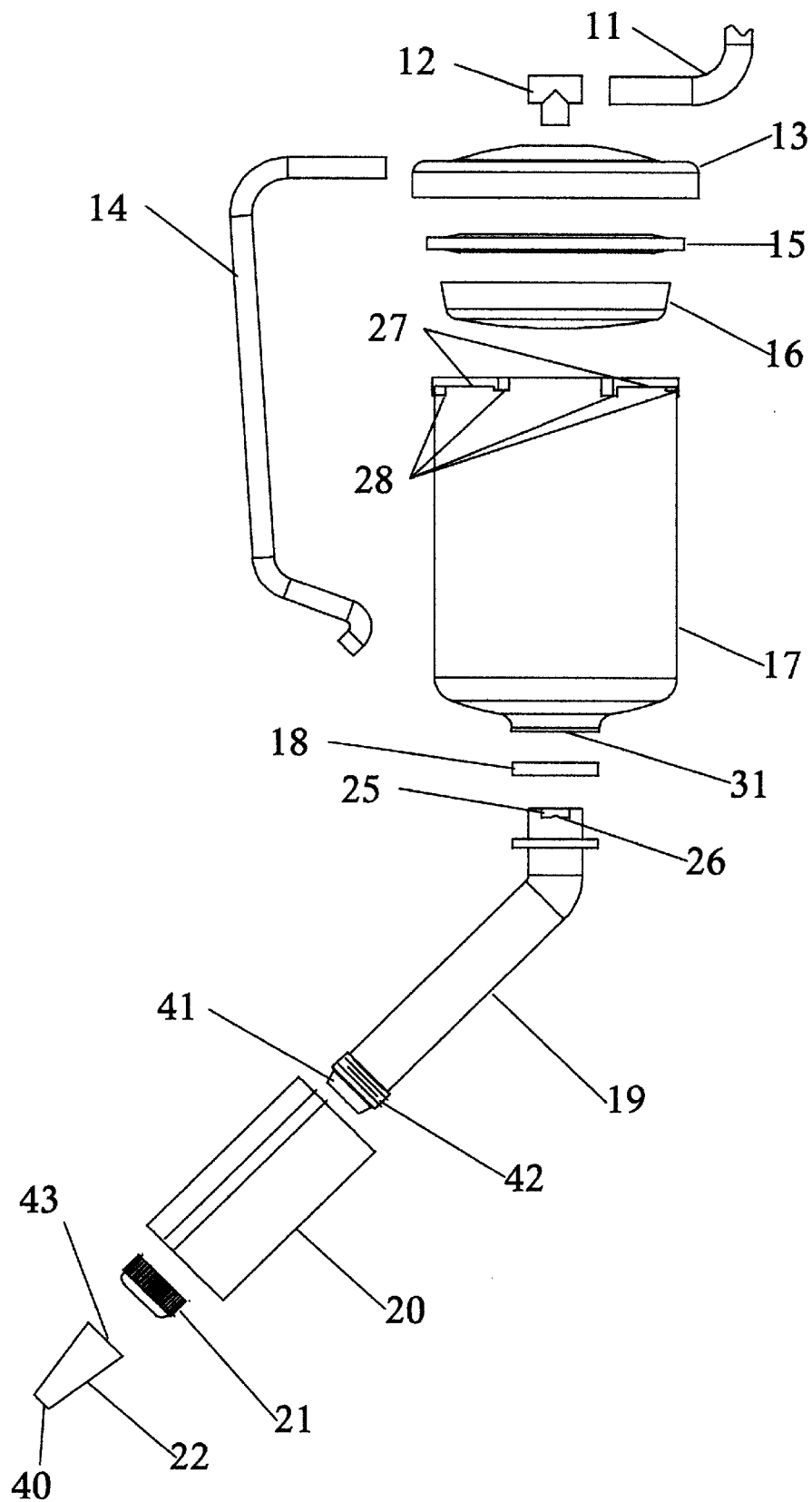
FIG. 1 is an exploded side elevation view of the applicator assembly.
Figure 2:
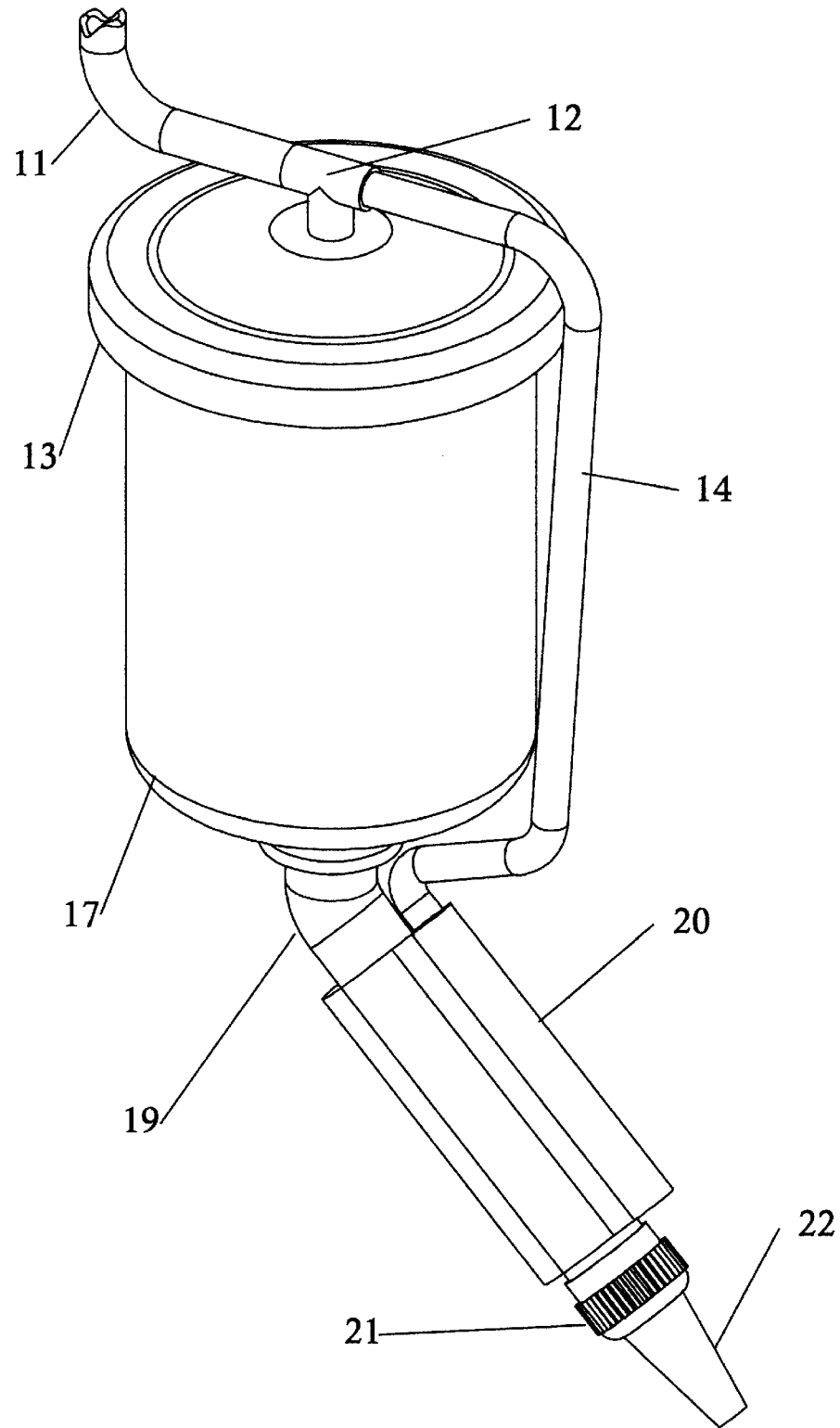
FIG. 2 is an assembled isometric view of the applicator assembly.
Figure 5:
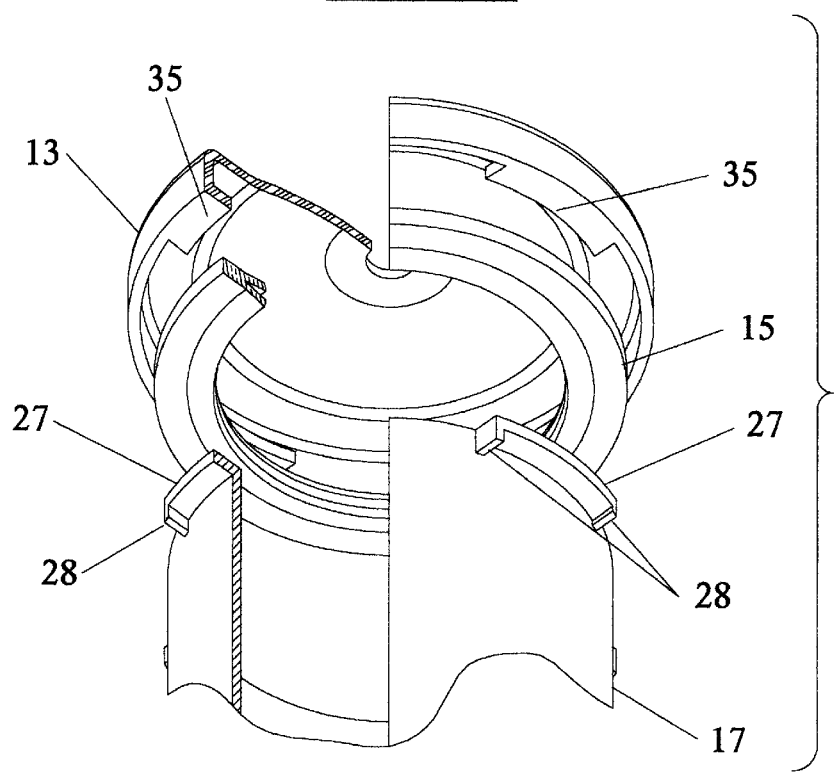
FIG. 5 is an isometric exploded partial cutaway view of the container and cover interface.

Referring to FIGS. 1, 3 and 5, the opposite end of the container 17 is fitted with a mating cover 13 having a plurality of internal annular flanges 35. To provide sealing, a gasket 15 is positioned between the cover 13 and container 17. The geometry of the gasket 15 is configured in such a way that pressure internal to the container air space 34 tends to tighten the seal.

Figure 6:
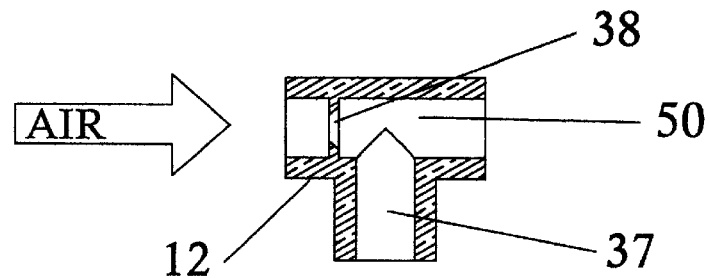
FIG. 6 is an enlarged sectional view of the tee fitting with integral orifice.
Figure 7:
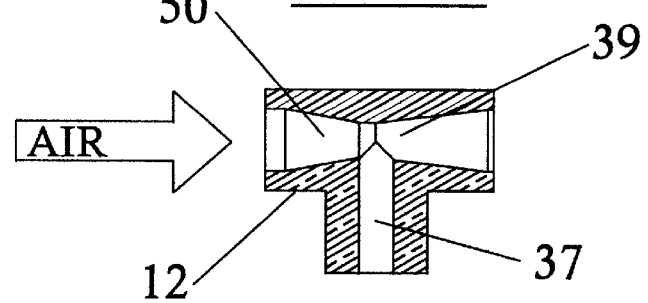
FIG. 7 is an enlarged sectional view of the tee fitting with integral venturi.

Referring to FIGS. 6 and 7, the cover 13 has a circular opening 36 through which a unique tee fitting (or "T") 12 is sealably attached by the "T's" branch 37. The "T" 12 provides for attachment of the supply air tube 11 and the air discharge tube 14 on either end of the run 50 and further provides pressurizing air to the container through the branch 37 of the "T" 12. In one embodiment of the invention, the "T" 12 has an integral orifice 38. In another embodiment, the "T" 12 has a venturi 39. The supply air tube 11 supplies clean, dry air at controlled pressure from a separate remote compressed air source.

Figure 8:
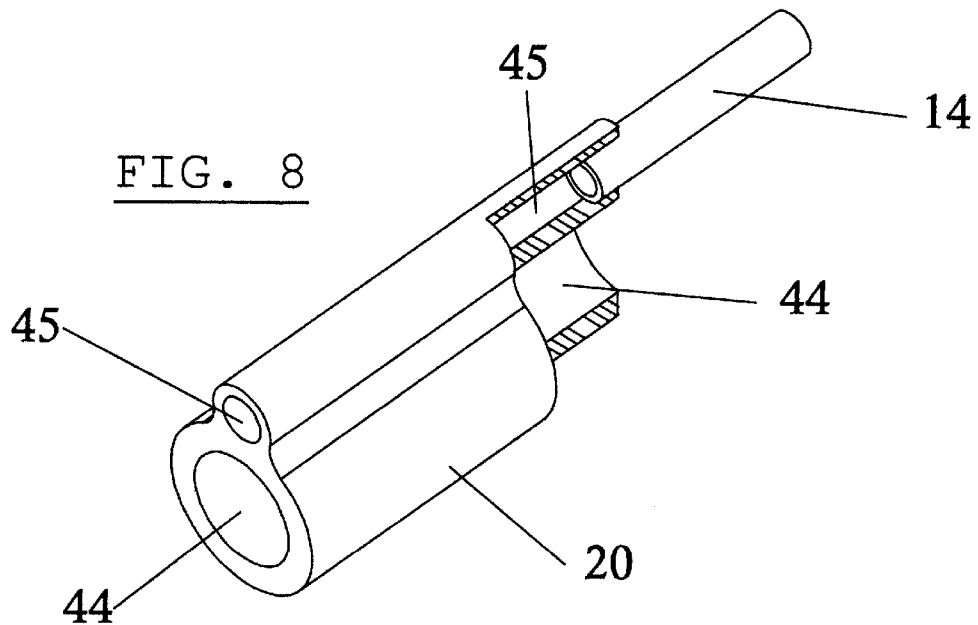
FIG. 8 is a cut away isometric view of the valve with the air discharge tube in place.
Figure 9:
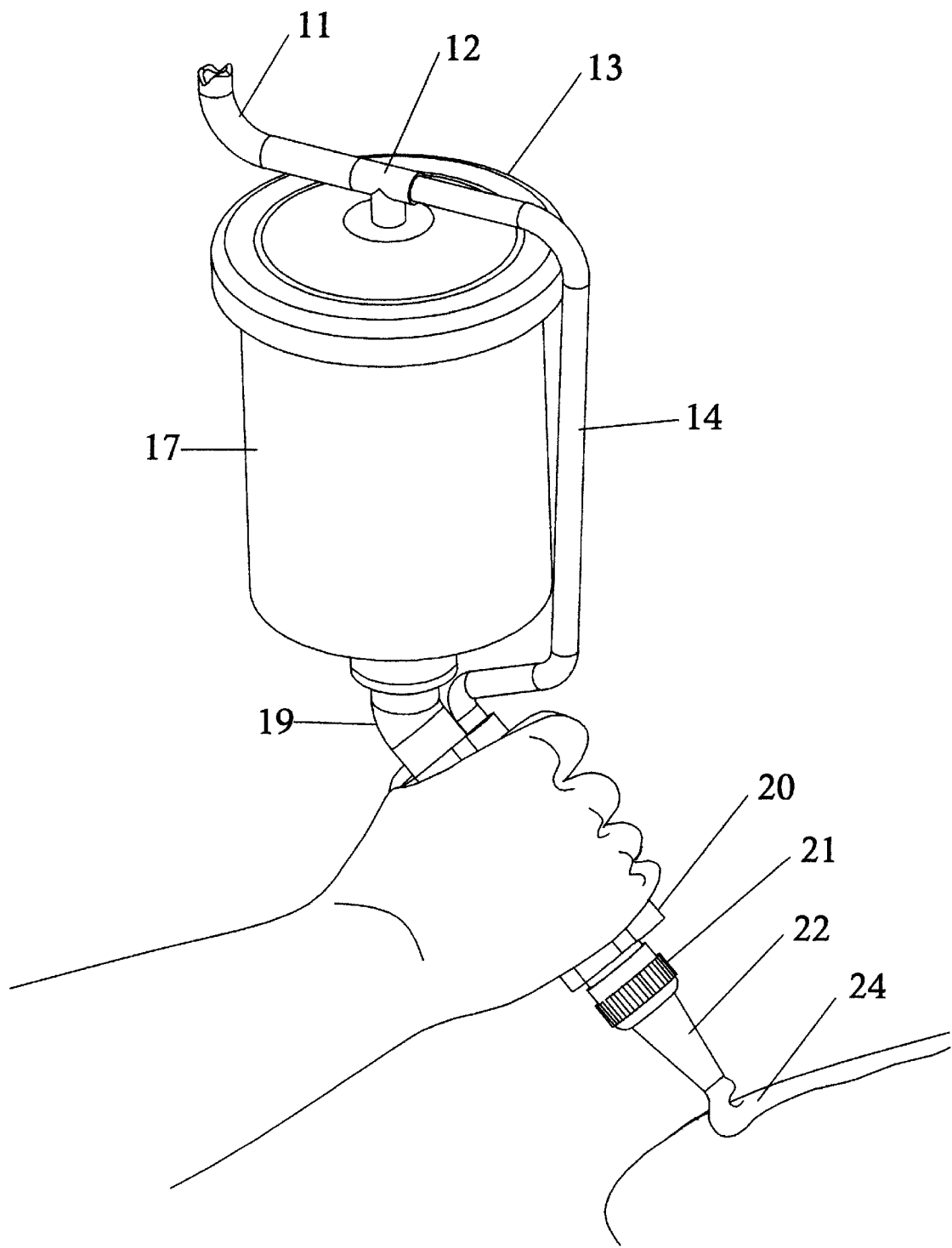
FIG. 9 is a perspective view of the applicator in use to demonstrate hand position.

Referring to FIG. 8, the trigger valve 20 consists of an elastomeric member having two offset channels along its length which have parallel axes. One of the two channels 44 is sized to provide a non-slipping coaxial fit with the external diameter of the dispensing tube 19. The second of the two channels 45 is sized to provide a coaxial non-slipping sealing fit with the external diameter of the air discharge tube 14. It is envisioned that the diameter of the channel which receives the dispensing tube will be larger than the diameter of the channel which receives the air discharge tube.

The trigger valve 20 is positioned on the dispensing tube 19 to provide a comfortable, cushioned grip for the operator. The air discharge tube 14 feeds through channel 45 of the trigger valve 20 such that the air discharge tube 14 vents to the atmosphere when the trigger valve 20 is open. The operator closes the trigger valve 20 by collapsing channel 45 with any or all of the fingers. By using all of the fingers and by using a low durometer material for the trigger valve 20, repetitive forces applied by the hand can be minimized. Further, the trigger valve 20 provides sealing without the use of additional parts and is therefore simple and economical to construct. The non-slipping fit between the trigger valve 20 and dispensing tube 19 provides for relatively easy axial and rotary adjustment by the operator to maximize comfort, usability, and visibility.

When the trigger valve 20 is closed, the air flow path is through the branch 37 of the "T" 12, pressurizing the air space 34 in the interior of the container 17. In operation, the air pressure acts on a piston 16 which helps force the material 24 through the outlet 31 of the container 17. The piston 16 is of sufficient length to remain coaxial with the container 17. The piston 16 has an integral rib 23 to be used as a handle for removal. When the container 17 is pressurized above the piston 16, a pressure differential is created between the air space 34 in the container and the atmosphere at the end of the dispensing tube 19. This pressure differential serves to propel the piston 16 axially along the bore 29 of the container 17 forcing the material 24 through the outlet 31. It is not necessary to have an air-tight seal between the piston 16 and the container 17. The pressure differential will cause the material 24 to dispense without the presence of the piston 16; however, the piston 16 acts as a follower to prevent air pockets and uneven flow of the material 24. When the trigger valve 20 is open, the air flows through the run 50 of the "T" 12, creating a low pressure tap at the integral orifice or venturi and creating a slight vacuum in the container air space 34. The vacuum creates a negative pressure differential between the air space 34 in the container 17 and the atmosphere at the end of the dispense tube 19. Said negative pressure differential causes the piston 16 to immediately cease its axial motion toward the outlet 31. The sudden reversal of the pressure differential prevents material 24 at the nozzle tip 40 from dripping. Further, the speed of dispense can be easily controlled by partially collapsing the trigger valve 20, thus partially constricting air flow creating a low pressurization of the air space 34 in the container 17. This slows the axial progression of the piston 16 through the container 17.

Referring to FIG. 3, the dispensing tube 19 which is attached to the outlet 31 of the container 17 is rigid and forms an angle 53 about between fifteen and forty-five degrees from the axis of the container, thus providing a neutral and natural position of the user's wrists and hands during dispensing operations. The angle 53 also serves the useful purpose of allowing the operator to view the frosting as it is discharged from the nozzle 22 while maintaining the weight of the device comfortably above the hands. The dispensing tube 19 simulates the feel and operation of existing decorating bags to eliminate the need for retraining operators. In operation of existing decorating bags, most decorators maintain their hands in a vertical or near-vertical power grip position such that the frosting is applied in a downward direction. This same positioning of the hands on the dispensing tube is maintained with the instant invention to facilitate an easy transition to using it.

The dispensing tube 19 provides for attachment of a variety of standard decorating nozzles 22 held in place by an ergonomically designed compression nut 21. The nozzle 22 acts as an extrusion die creating a constant cross section of material 24, the length of which is controlled by the amount of time that the trigger valve 20 is open. The nozzles 22 are typically made of thin gauge metal with a tapered conical shape. The dispensing tube 19 includes a chamfer 41 on the external perimeter of one end to mate with the nozzle 22 and further provides a threaded coupling 42 to accept the compression nut 21.

The compression nut 21 is an annular threaded member having a concentric round opening substantially smaller than the large end 43 of the tapered nozzle 22. With the large end 43 of the nozzle 22 placed concentrically on the chamfer 41 of the dispensing tube 19, the compression nut 21 is threadably engaged onto the dispense tube 19, thereby aligning the nozzle 22 axially with the dispensing tube 19 and compressing the large end 43 of the nozzle 22 onto the chamfer 41 of the dispensing tube 19, providing a seal against the flow of the dispensing material 24.

Figure 12:
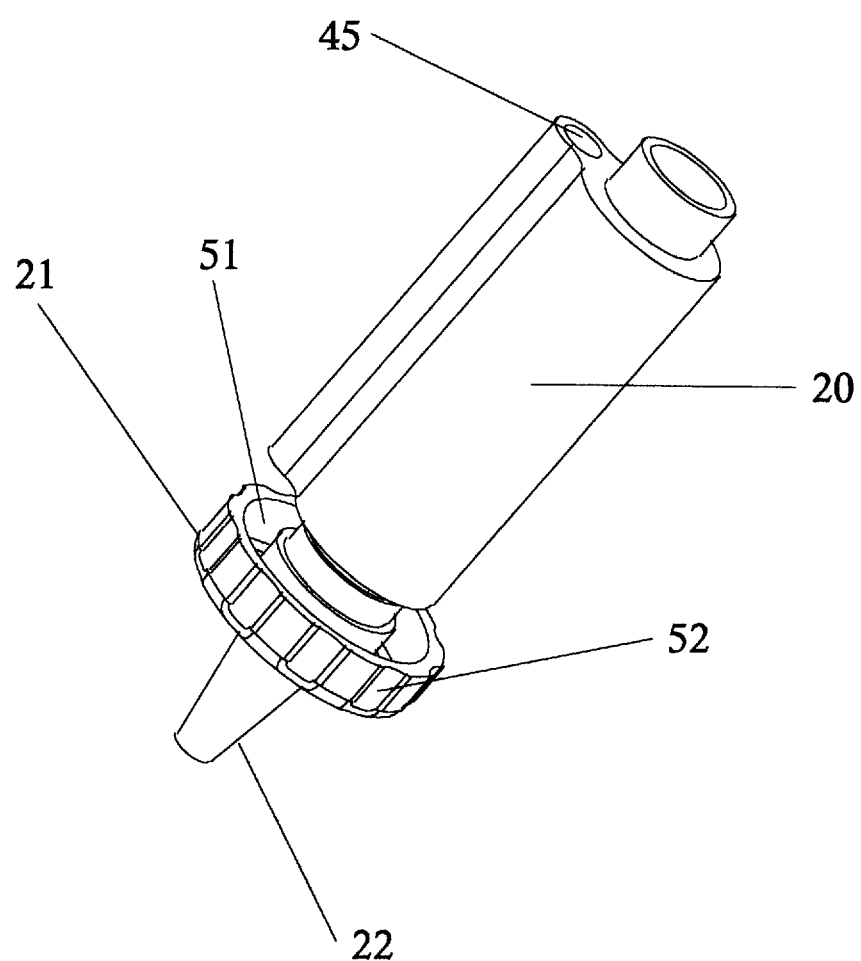
FIG. 12 is a partial detail view of the compression nut.

As shown in FIG. 12, a preferred embodiment of the compression nut 21 provides for a larger diameter than those commonly used on decorating bags and provides a plurality of external ridges 52 or similar features to improve the operator's grip. The larger diameter of the compression nut 21 further provides for an air dam 51 to redirect any residual air from the air discharge tube 14 in the trigger valve 20 away from the item being decorated.

Figure 10:
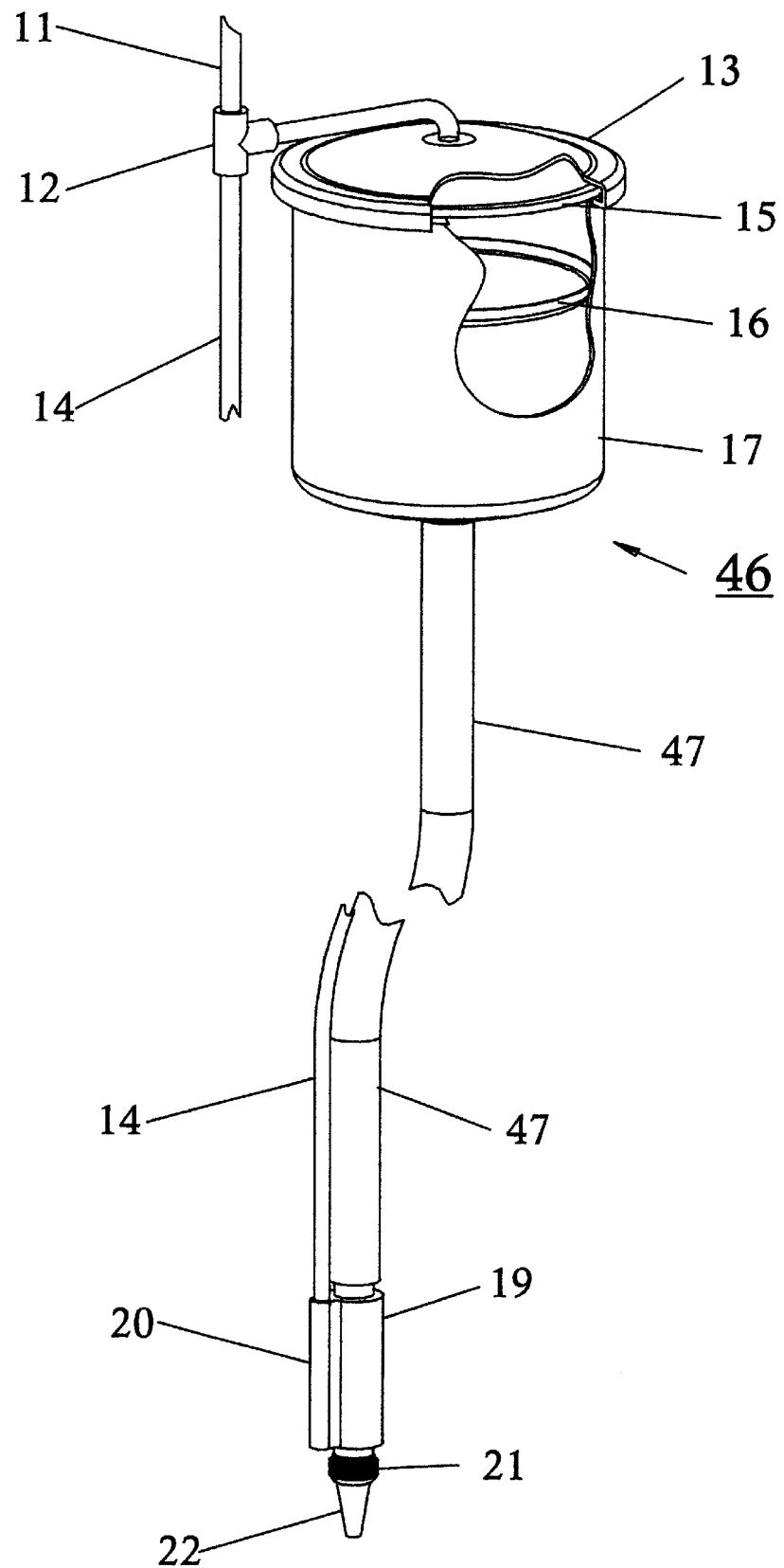
FIG. 10 is an assembled isometric view of an optional configuration using a remote material container with a cut away section showing components internal to the container, and with tube broken to simplify.

Referring now to FIG. 10, an optional configuration of the invention is shown. The optional embodiment 46 includes a container 17 remote from the dispensing tube 19 and connected by a flexible supply tube 47 from the outlet 31 of the container 17 to one end of the dispensing tube 19. A remotely located container 19 can hold more materials and thus is not restricted by the weight limitations imposed by a hand held model. The container 19 can be placed in a convenient location to provide a non-interfering position for the supply tubing 47 and may be positioned either by a hanging bracket or by a cradle.

Figure 11:
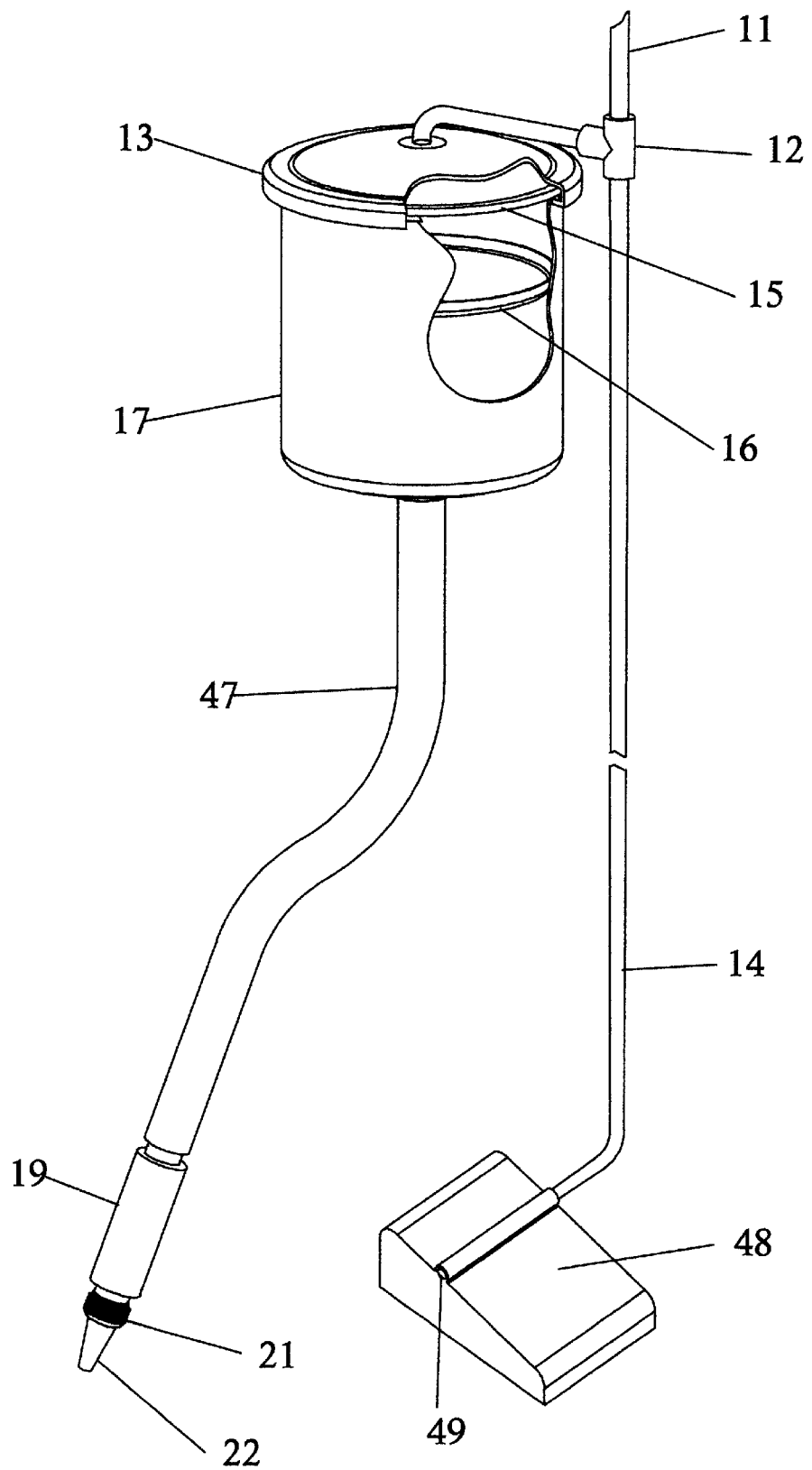
FIG. 11 is a partial view of the optional configuration using a foot operated valve to control the air supply.

Referring now to FIG. 11, an optional configuration for the valve is shown. Where permitted, a foot actuated valve 48 may be used to control material flow. The foot actuated valve 48 consists of an elastomeric wedge-shaped device having an angle conducive to foot operation. Said device also has integrally molded a small diameter hole 49 sized to provide a non-slipping coaxial sealing fit with the air discharge tube 14. To operate, the operator closes the valve 48 by depressing the hollow small diameter 49 with the foot. As with the hand operated trigger valve 20, speed of dispensing can be controlled by partially collapsing the valve.

While the preferred embodiment of the present invention is shown and described, it is envisioned that those skilled in the art may devise various modifications of the present invention without departing from the spirit and scope of the claims. The invention is not intended to be limited by the foregoing disclosure, but only by the following claims:

I claim:

1. A pneumatic frosting applicator comprising:
   (a) a container having a top end and a bottom end, said bottom end having an outlet;
   (b) a cover, said cover having an aperture, said cover also having the capacity to attach to said top end of said container in conjunction with a seal;
   (c) a piston coaxially aligned within said container;
   (d) a dispensing tube having a first end and a second end, said first end fixedly attached to said container at said outlet;
   (e) a nozzle engaged to said second end of said dispensing tube by means of a compression nut;
   (f) a hollow tee fitting having a branch and a run, and an integral orifice at the intersection of said branch and said run, said branch connected to said aperture of said cover, said run having a first end and a second end;
   (g) a supply air tube connected to said first end of said run;
   (h) an air discharge tube, having a first end and a second end, said first end of said air discharge tube connected to said second end of said run;
   (i) a trigger valve having a first channel and a second channel which are coaxially aligned and in parallel with one another, said first channel axially receiving said dispensing tube, said second channel axially receiving said second end of said air discharge tube; and
   (j) a means for supplying pressurized air to said supply air tube.

2. A pneumatic frosting applicator according to claim 1 wherein said integral orifice in said tee fitting is a venturi.

3. A pneumatic frosting applicator according to claim 2 wherein said compression nut has an edge and a face, said compression nut further having a plurality of ridges on said edge, said face having a width sufficient to block air from said second end of said air discharge tube.

4. A pneumatic frosting applicator according to claim 1 wherein said compression nut has an edge and a face, said compression nut further having a plurality of ridges on said edge, said face having a width sufficient to block air from said second end of said air discharge tube.

5. A pneumatic frosting applicator comprising:
   (a) a container having a top end and a bottom end, said bottom end having an outlet;
   (b) a cover, said cover having an aperture, said cover also having the capacity to attach to said top end of said container in conjunction with a seal;
   (c) a piston coaxially aligned within said container;
   (d) a dispensing tube having a first end and a second end, said first end fixedly attached to said container at said outlet;
   (e) a nozzle engaged to said second end of said dispensing tube by means of a compression nut;
   (f) a hollow tee fitting having a branch and a run, and an integral orifice at the intersection of said branch and said run, said branch connected to said aperture of said cover, said run having a first end and a second end;
   (g) a supply air tube connected to said first end of said run;
   (h) an air discharge tube, having a first end and a second end, said first end of said air discharge tube connected to said second end of said run;
   (i) a foot-actuated trigger valve having a first channel for receiving said air discharge tube; and
   (j) a means for supplying pressurized air to said supply air tube.

6. A pneumatic frosting applicator according to claim 5 wherein said integral orifice in said tee fitting is a venturi.

7. A pneumatic frosting applicator according to claim 6 wherein said compression nut has an edge and a face, said compression nut further having a plurality of ridges on said edge, said face having a width sufficient to block air from said second end of said air discharge tube.

8. A pneumatic frosting applicator according to claim 5 wherein said compression nut has an edge and a face, said compression nut further having a plurality of ridges on said edge, said face having a width sufficient to block air from said second end of said air discharge tube.

9. A pneumatic frosting applicator according to claims 1, 2, 3, 4, 5, 6, 7 or 8 wherein said dispensing tube is angled about between fifteen and forty-five degrees from the axis of said container.

10. A pneumatic frosting applicator comprising:
    (a) a container having a top end and a bottom end, said bottom end having an outlet;
    (b) a cover, said cover having an aperture, said cover also having the capacity to attach to said top end of said container in conjunction with a seal;
    (c) a piston coaxially aligned within said container;
    (d) a flexible supply tube having a top opening and a bottom opening, said top opening fixedly attached to said container at said outlet;
    (e) a dispensing tube having a first end and a second end, said first end fixedly attached to said bottom opening of said flexible supply tube;
    (f) a nozzle engaged to said second end of said dispensing tube by means of a compression nut;
    (g) a hollow tee fitting having a branch and a run, and an integral orifice at the intersection of said branch and said run, said branch connected to said aperture of said cover, said run having a first end and a second end;
    (h) a supply air tube connected to said first end of said run;
    (i) an air discharge tube, having a first end and a second end, said first end of said air discharge tube connected to said second end of said run;
    (j) a trigger valve having a first channel and a second channel which are coaxially aligned and in parallel with one another, said first channel axially receiving said dispensing tube, said second channel axially receiving said second end of said air discharge tube;
    (j) a means for supplying pressurized air to said supply air tube; and
    (k) a means for supporting said container.

11. A pneumatic frosting applicator according to claim 10 wherein said integral orifice in said tee fitting is a venturi.

12. A pneumatic frosting applicator according to claim 11 wherein said compression nut has an edge and a face, said compression nut further having a plurality of ridges on said edge, said face having a width sufficient to block air from said second end of said air discharge tube.

13. A pneumatic frosting applicator according to claim 11 wherein said compression nut has an edge and a face, said compression nut further having a plurality of ridges on said edge, said face having a width sufficient to block air from said second end of said air discharge tube.

14. A pneumatic frosting applicator comprising:
   (a) a container having a top end and a bottom end, said bottom end having an outlet;
   (b) a cover, said cover having an aperture, said cover also having the capacity to attach to said top end of said container in conjunction with a seal;
   (c) a piston coaxially aligned within said container;
   (d) a flexible supply tube having a top opening and a bottom opening, said top opening fixedly attached to said container at said outlet;
   (e) a dispensing tube having a first end and a second end, said first end fixedly attached to said bottom opening of said flexible supply tube;
   (f) a nozzle engaged to said second end of said dispensing tube by means of a compression nut;
   (g) a hollow tee fitting having a branch and a run, and an integral orifice at the intersection of said branch and said run, said branch connected to said aperture of said cover, said run having a first end and a second end;
   (h) a supply air tube connected to said first end of said run;
   (i) an air discharge tube, having a first end and a second end, said first end of said air discharge tube connected to said second end of said run;
   (j) a foot-actuated trigger valve having a first channel for receiving said receiving said air discharge tube;
   (j) a means for supplying pressurized air to said supply air tube; and
   (k) a means for supporting said container.

15. A pneumatic frosting applicator according to claim 14 wherein said integral orifice in said tee fitting is a venturi.

16. A pneumatic frosting applicator according to claim 15 wherein said compression nut has an edge and a face, said compression nut further having a plurality of ridges on said edge, said face having a width sufficient to block air from said second end of said air discharge tube.

17. A pneumatic frosting applicator according to claim 14 wherein said compression nut has an edge and a face, said compression nut further having a plurality of ridges on said edge, said face having a width sufficient to block air from said second end of said air discharge tube.

* * * * *